Nov. 10, 1931.  O. LARSEN  1,831,457
VALVE
Filed Oct. 25, 1926    2 Sheets-Sheet 1
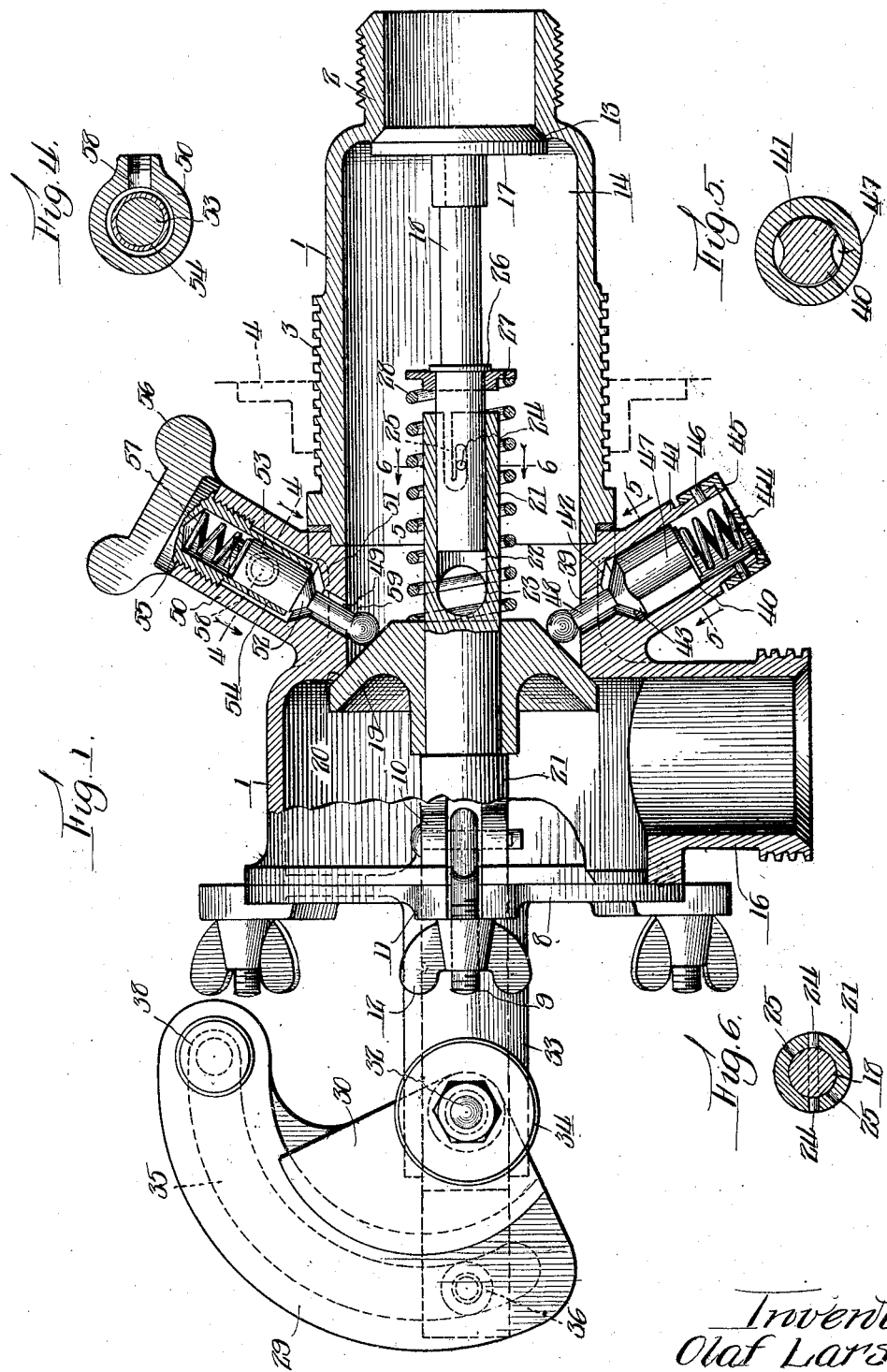
Inventor
Olaf Larsen,
By Hewitt S. Dixon
Atty.

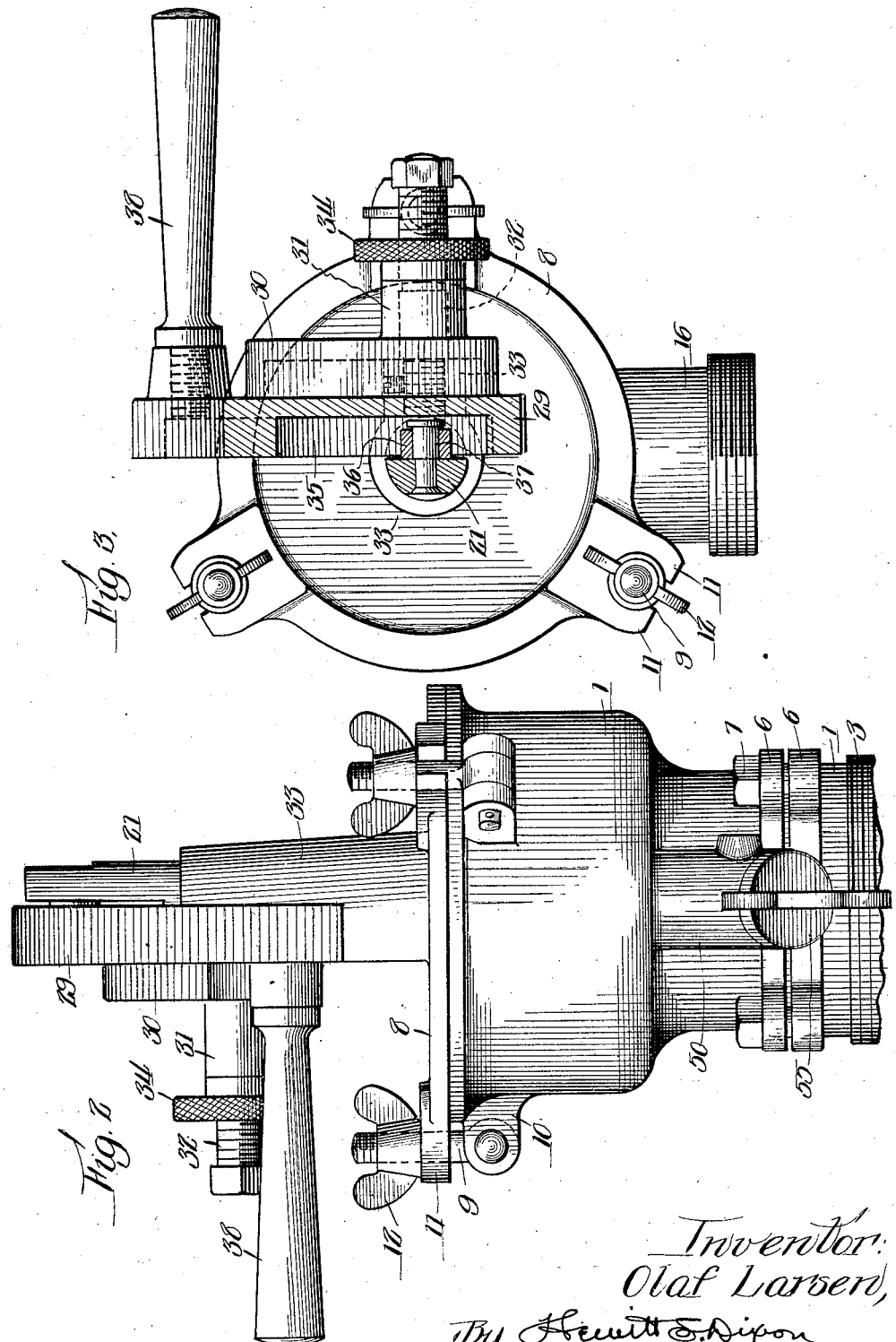

Patented Nov. 10, 1931

1,831,457

UNITED STATES PATENT OFFICE

OLAF LARSEN, OF FORT ATKINSON, WISCONSIN, ASSIGNOR TO THE CREAMERY PACKAGE MFG. COMPANY, OF CHICAGO, ILLINOIS, A CORPORATION OF ILLINOIS

VALVE

Application filed October 25, 1926. Serial No. 143,833.

The invention relates to valves for the control of the flow of edible fluids and known as sanitary valves.

In the preparation of milk for food consumption one of the processes employed is pasteurization by which the pathogenic bacteria are destroyed. The common method of pasteurization is to hold quantities of milk at a predetermined temperature for a predetermined time in insulated or heated containers. The milk is ordinarily treated in successive batches, the containers being filled and emptied through sanitary piping controlled by sanitary valves positioned at the inlets and outlets of the containers. It will be obvious that any leakage or failure in these valves will permit the uncontrolled flow through the container of a quantity of milk which has not been held for the required time at the necessary temperature. If such leakage is permitted to pass into the discharge conduits with the properly pasteurized milk the latter is in danger of reinoculation by the undestroyed bacteria in the milk which has escaped the prescribed treatment.

Also it is obviously necessary that all containers, piping and controlling valves used in the treatment of milk for food consumption be kept in a sanitary condition. This requires that such apparatus be constructed so that the parts may be readily disassembled for thorough cleaning after their operative use.

It is the principal object of this invention to provide an improved sanitary valve which is constructed to direct outwardly from the main passages any leakage occurring in the valve when it is in closed position. Another object is to provide for the sterilization of the interior of the valve chambers between periods of operation. A further object is to provide a valve of simple construction which may be conveniently and quickly taken down for cleaning.

Other objects and advantages will be apparent in the following description of a preferred embodiment of the invention which I have selected for illustration in the accompanying drawings. It will be understood, however, that various changes in form, construction and arrangement may be made by those skilled in the art without departing from the scope and spirit of the invention as expressed in the appended claim.

Referring to the drawings, Fig. 1 is a sectional side elevation of the valve. Fig. 2 is a plan view of the front portion of the valve and Fig. 3 is a front elevation of the valve. Figs. 4, 5 and 6 are detail sectional views taken on the planes respectively of lines 4—4, 5—5 and 6—6 in Fig. 1.

The reference numeral 1 indicates a chambered casing having a restricted tubular end portion 2 outwardly threaded for securing entry into a suitable outlet fitting (not shown) opening from a conventional vat or tank for holding quantities of liquid. The casing may be further provided with outer threads as indicated at 3 upon which may be mounted a flanged washer 4 adapted to bear upon the outer wall of the vat or tank to which the valve structure is to be attached. The casing 1 is preferably divided transversely as indicated at 5, the front portion being secured to the rear portion by means of flanges 6 in which securing bolts 7 are positioned. The open front end of the casing is provided with a removable closure plate 8 secured to the casing by means of swinging eye bolts 9 pivoted to the casing between supporting lugs 10 and swingable into the slotted extensions 11 of the cover plate, the bolts carrying thumb nuts 12 adjustably bearing upon the cover plate extensions 11 and securing the plate in position.

The tubular restricted portion 2 of the casing inwardly forms the inlet opening 13 to the main chamber 14 of the valve structure, the latter having its outlet through the front portion of the casing and the tubular extension 16, the latter being suitably threaded for the attachment of conventional piping.

The inlet opening 13 is controlled by a longitudinally movable valve 17 having its seat at the entrance to the main chamber 14. The valve 17 is operatively supported by a stem 18 extending frontwardly through the chamber 14. The outlet from the chamber 14 is controlled also by a longitudinally movable valve 19 seated upon a shoulder 20 formed in the wall of the chamber. The outlet valve 19 is operatively supported upon the operating stem 21, having its bearing in the cover plate 8 and extending therethrough for operation by means hereinafter described. The operating stem 21 extends oppositely into the chamber 14, and is there provided with an axial bore 22 at the base of which the stem is cross bored as at 23 in intersection of the axial bore. The cross bore 23 provides ready access for cleaning out the axial bore.

The inlet valve suporting stem 18 extends into the bore 22 in the outlet valve supporting stem, the inlet valve stem being provided with a cross pin 24 which, in assembling, passes through the bayonet slots 25 (see Figs. 1 and 6) being normally positioned in the reverse portions of the slots. The inlet valve stem 18 is provided with an annular shoulder 26 against which rests a stop washer 27. A coiled spring 28, positioned between the stop washer 27 and the inner face of the outlet valve 19, tends to force the inlet stem 18 outwardly of the bore 22 to the limit of the engagement of the pin 24 with the outer ends of the reserve slots. This latter construction functions in the operation of the valve to permit the closing of the inlet valve in advance of the closing of the outlet valve, the inlet valve stem 18 passing into the bore 22 against the resistance of the spring 27 in the completing of the closing movement of the outlet valve 19.

The outlet valve stem 21 may be operated outwardly of the casing by any suitable means, that herein illustrated comprising a cam 29 having a flange 30 and hub 31 for pivotal support upon a stud 32 secured in a bracket 33 formed on the front cover plate 8. The cam member may be secured in selective position by means of the knurled nut 34 threaded on the stud 32 and outwardly bearing upon the hub 31. The cam 29 is provided with an eccentric groove 35 within which is operatively positioned a roller 36 carried by a stud 37 fixed in the end portion of the operating stem 21, and by which longitudinal movement of the latter is caused by the swinging of the cam on its pivotal support, the cam being thus operated by means of the handle 38 secured thereto.

The inlet and outlet valves and their supporting stems may be quickly removed as a unit from the casing by the release of the thumb nuts 12 and withdrawal of the cover plate 8, thus exposing the valve parts and the interior of the casing for cleaning and sterilization. The inlet valve stem being withdrawn from the bore 22 permits the thorough cleaning of those inter-engaging parts.

Intermediate of the inlet and outlet valves the casing 1 is provided with an auxiliary outlet opening 39, preferably positioned in the lowermost portion of the casing and directed outwardly of the normal passage through the valve structure. The auxiliary outlet opening 39 is controlled by means of a sliding valve 40, operatively supported in a tubular extension 41 of the casing, the inner diameter of the tubular extension being greater than the diameter of the auxiliary outlet opening 39 and providing a tapered shoulder 42 forming a seat for the tapered inner end 43 of the sliding valve 40. The latter is normally held in its seat by a spring 44 bearing upon the outer end of the valve and outwardly retained by a perforated cap 45 having bayonet slots for engagement with the pins 46 mounted in the tubular extension 41.

The valve 41 is provided with longitudinal lateral grooves 47 forming passageways thereby for liquid escaping through the auxiliary outlet 39. The inner end of the valve 40 is provided with an inwardly extending stem 48 which preferably has a rounded end portion positioned for contact within the chamber 14 with the outlet valve 19 when the latter is in closed position, whereby, in the closing operation of the outlet valve, the auxiliary valve 40 is pushed from its seat and the auxiliary outlet 39 is opened for the escape of any leakage occurring past the inlet valve 17 when closed, and also for the escape of sterilizing fluid introduced to the chamber 14 as hereinafter described.

Provision for the entry of sterilizing fluid into the chamber, when the inlet and outlet valves are in closed position, is effected by the auxiliary inlet opening 49 which is directed outwardly through another tubular extension 50 of the casing and preferably opening into the upper side of the chamber. The inner diameter of the tubular extension 50 is also greater than the passage to the auxiliary inlet opening 49, forming a tapered shoulder 51 upon which is normally seated the tapered front end 52 of the sliding valve 53. The latter is operatively supported in a sleeve 54 carried by the end closure 55 which is threaded into the end portion of the tubular extension 50, the end closure or cap 55, for convenience of removal and replacing, carrying the thumb wings 56. The valve 53 is normally maintained in seated position by the spring 57 positioned within the sleeve and confined between the cap 55 and the outer end of the valve 53.

The sleeve 54 is of cross dimension to provide an annular space between the sleeve and the inner wall of the tubular extension 50, the space thus provided being in communication with a lateral inlet 58 (see Fig. 4) preferably threaded for the attachment of suitable piping for conducting steam or other sterilizing fluid to the auxiliary inlet opening 49. The valve 53 is also provided with an inwardly extending stem 59 having its preferably rounded end within the chamber 14 for engagement by the outlet valve 19 in the closing operation of the latter, thereby opening the auxiliary inlet for the admittance of the sterilizing fluid.

It will here be aparent that with the closing movement of the operating stem 21, the inlet valve 17 is first closed, thus permitting the passage from the chamber 14 of the liquid therein, when the inlet valve is closed, through the normal outlet before the outlet valve 19 is finally seated. As the latter valve approaches its seat it engages the auxiliary inlet and outlet valve stems 59 and 48, opening the auxiliary inlet and outlet for the admission of sterilizing steam throughout the chamber 14 and for its exhaust from the chamber with any liquid remaining therein. The passage of steam through the chamber also keeps the valve parts hot during the period in which the main valves are closed. Any leakage occurring during this period through the inlet valve will at the same time be sterilized and carried off through the auxiliary outlet.

I claim as my invention:

A device of the class described, comprising a casing enclosing a chamber having an inlet opening and an outlet opening and having a pair of auxiliary openings intermediate of said inlet and outlet openings, one of said auxiliary openings being positioned to drain the intermediate portion of said chamber and the other of said auxiliary openings being adapted for the admittance of sterilizing fluid to said chamber, a pair of valves controlling said inlet and outlet openings operable to open and close said inlet and outlet openings and a pair of valves resiliently actuated to close said auxiliary openings, each of said latter valves having a portion extending into direct engagement with said outlet valve when said outlet-valve is in closed position whereby said auxiliary valves are opened by the closing movement of said outlet valve.

In witness whereof I have hereunto attached my signature.

OLAF LARSEN.